United States Patent
Futia et al.

(10) Patent No.: US 10,900,874 B2
(45) Date of Patent: Jan. 26, 2021

(54) APPARATUS, METHOD, AND SYSTEM FOR FILTER BASED CELL CAPTURE AND LABELING WITH CONFIGURABLE LAYDOWN AREA

(71) Applicant: THE REGENTS OF THE UNIVERSITY OF COLORADO, a body corporate, Denver, CO (US)

(72) Inventors: Gregory Futia, Denver, CO (US); Emily A. Gibson, Boulder, CO (US); Kian Behbakht, Greenwood Village, CO (US)

(73) Assignee: THE REGENTS OF THE UNIVERSITY OF COLORADO, A BODY CORPORATE, Denver, CO (US)

( * ) Notice: Subject to any disclaimer, the term of this patent is extended or adjusted under 35 U.S.C. 154(b) by 725 days.

(21) Appl. No.: 15/527,217

(22) PCT Filed: Nov. 19, 2015

(86) PCT No.: PCT/US2015/061608
§ 371 (c)(1),
(2) Date: May 16, 2017

(87) PCT Pub. No.: WO2016/081737
PCT Pub. Date: May 26, 2016

(65) Prior Publication Data
US 2017/0356827 A1    Dec. 14, 2017

Related U.S. Application Data

(60) Provisional application No. 62/082,071, filed on Nov. 19, 2014.

(51) Int. Cl.
*G01N 1/00* (2006.01)
*G01N 1/31* (2006.01)
(Continued)

(52) U.S. Cl.
CPC ............... *G01N 1/312* (2013.01); *G01N 1/40* (2013.01); *G06K 9/00134* (2013.01);
(Continued)

(58) Field of Classification Search
CPC ....................................................... G01N 1/00
See application file for complete search history.

(56) References Cited

U.S. PATENT DOCUMENTS

| 6,733,433 B1 | 5/2004 | Fell |
| 2006/0060531 A1 | 3/2006 | Coville et al. |

(Continued)

FOREIGN PATENT DOCUMENTS

WO    WO 2014/108882    7/2014

OTHER PUBLICATIONS

International Search Report and Written Opinion for International (PCT) Patent Application No. PCT/US2015/061608, dated Jan. 29, 2016 11 pages.

(Continued)

*Primary Examiner* — Jyoti Nagpaul
(74) *Attorney, Agent, or Firm* — Dorsey & Whitney LLP

(57) ABSTRACT

Devices and methods for labeling and mounting suspended cells in a controllable area are disclosed. The devices and methods utilize polycarbonate filters. The filters are employed both to capture the cells and as a substrate for labeling. This disclosure provides a device for cell capture and staining. This device utilizes a stack comprising a filter sandwiched between two o-rings (an "OFO stack") in which the o-rings both seat the device and, based on their outer diameter and cross-section, determine the cell capture area. In one embodiment, an alignment plate is affixed to an output head of the device, the alignment plate having one or more through holes, a diameter of the one or more through holes matching an outer diameter of the OFO stack.

18 Claims, 4 Drawing Sheets

(51) Int. Cl.
 *G06K 9/00* (2006.01)
 *G01N 1/40* (2006.01)
(52) U.S. Cl.
 CPC ........... *G01N 2001/4088* (2013.01); *G01N 2333/4742* (2013.01); *G01N 2333/70589* (2013.01)

(56) References Cited

U.S. PATENT DOCUMENTS

2011/0033924 A1   2/2011   Berry et al.
2012/0244529 A1   9/2012   Fuchs et al.
2014/0110349 A1*  4/2014   Bangert .............. A61M 1/3403
                                                          210/741

OTHER PUBLICATIONS

International Preliminary Report on Patentability for International (PCT) Patent Application No. PCT/US2015/061608, dated Jun. 1, 2017 9 pages.

* cited by examiner

APPARATUS, METHOD, AND SYSTEM FOR FILTER BASED CELL CAPTURE AND LABELING WITH CONFIGURABLE LAYDOWN AREA

CROSS-REFERENCE TO RELATED APPLICATIONS

This application is a national stage application under 35 U.S.C. 371 of PCT Application No. PCT/US2015/061608, having an international filing date of 19 Nov. 2015, which designated the United States, which PCT application claimed the benefit of U.S. Provisional Patent Application No. 62/082,071, filed 19 Nov. 2014, both of which is hereby incorporated by reference in their entirety.

TECHNICAL FIELD

This disclosure relates to apparatuses, methods, and systems for capturing and labeling cells within a configurable area.

BACKGROUND

Processing of low cell number fractions (less than about 10,000 cells) in suspension is challenging. Unlike with higher cell number fractions, in which the cells can be visualized during processing by forming "pellets" of cells, low cell number fractions typically do not allow visualizable pellets to form. Thus, a technician may be unaware whether he or she is losing cells in the process of removing fluids. Additionally, during preparation of low cell number fractions on substrates, the technician may experience problems with cells washing off during preparation. In almost all cases, cell losses from these and other sources, during processing steps such as fixation, staining, and mounting, are undesirable. Previously, technicians have captured cells for exposure to processing fluids, such as fixation media, washes, stains, and antibodies, by using filtering devices, which incorporate filters with pore sizes smaller than the cells of interest.

Most commercial filtering devices are designed with a filter permanently embedded into the device. This enables manufacturers of the devices to inexpensively ensure that the device is sealed, i.e. that processing fluids are forced through the filter between the device's input and output ports, without any other route of escape. These designs do not permit the filter to be removed from the device for further analysis of what has been captured by the filter, which is often of interest to the technician.

Other known devices allow the filter to be removed from the device after filtration. These devices permit, for example, optical or electron microscopy of what is captured on the filter, and thus have an advantage over devices with permanently embedded filters. However, all known devices, including those with removable filters, have a capture area of at least about 10 mm$^2$, and more typically about 31 mm$^2$. This is problematic when used to filter low cell number (less than about 10,000 cells) samples, as the cells tend to spread out across the filter area too sparsely to allow for efficient microscopy. A much smaller capture area of 2-3 mm$^2$ would be more appropriate for these low cell number samples.

Additionally, in some applications, such as rare cell identification (particularly circulating tumor cell identification), substantially all of the captured cells must be inspected. In these applications, complete inspection of a large, sparsely populated capture area can be extremely time-consuming and data-intensive.

Thus, there is a need in the art for filtering devices that can produce smaller capture areas. Ideally, such devices would allow for the size of the capture area to be configured by a technician to produce a sample with an optimal cell density.

SUMMARY

This disclosure provides a device for cell capture and staining. This device utilizes a stack comprising a filter sandwiched between two o-rings (an "OFO stack") in which the o-rings both seal the device and, based on their outer diameter and cross-section, determine the cell capture area. In one embodiment, an alignment plate is affixed to an output head of the device, the alignment plate having one or more through holes, a diameter of the one or more through holes matching an outer diameter of the OFO stack. The cell capture area can thus be changed by simply replacing the alignment plate with one having larger or smaller through holes. In some embodiments, the height of the alignment plate may be chosen such that the bottom o-ring, the filter, and at least part of the top o-ring fit inside a well created between the alignment plate and the output head, enabling the OFO stack to be easily set by simply stacking the bottom o-ring, filter, and top o-ring in the well. In further embodiments, the alignment plate may be split, such that it can be removed from the device before the OFO stack is unclamped, allowing better access to the filter for transfer or mounting.

Two alignment plates may be utilized, one affixed to the input head and the other affixed to the output head, to produce wells at both heads for assembling and setting the device. This design allows for the construction of a device utilizing a filter of any diameter, including filters with diameters larger than the outer diameter of the selected o-rings. Such embodiments are useful when a filter of the desired diameter is commercially unavailable, or when cutting a larger filter to the desired diameter is not feasible.

The device may comprise a staining volume in the input head. The staining volume allows processing fluids to sit atop the cells of interest on the filter in sufficient quantity to permit chemical action, such as fixing, staining, or labeling. In embodiments, the staining volume may be about 50 μL. The staining volume may be designed such that a height of the staining volume is great enough that a standard gel loading pipet tip with a length of 1 inch cannot pierce the loaded filter, thereby damaging or destroying it, but small enough that the pipet tip can reach within about 3 mm of the filter, such that processing fluids can be loaded atop the filter without introducing air bubbles.

Track-etched polycarbonate substrates may be utilized as filters. Such substrates are commercially available in a wide variety of pore sizes, from at least as small as about 200 nm to at least as large as about 5 μm, and a skilled artisan will recognize an appropriate pore size for a particular application. In one embodiment, substrates with pore size 800 nm are used, as may be optimal, by way of non-limiting example, for examining white blood cells. The use of track-etched polycarbonate substrates as filters is advantageous because such substrates are inexpensive (less than about $1 per filter).

Devices of this disclosure may be utilized with standard o-ring sizes at least as small as AS568-002, to produce cell capture areas at least as small as 2.3 mm$^2$.

This disclosure also provides a cell capture system, comprising a capture chamber, comprising a plurality of lanes; a stop cock panel, interconnected to a threaded connector of an output head of at least one lane of the capture chamber; a manifold, interconnected to the stop cock panel; and a regulator, interconnected to the manifold and to a vacuum source and controlling negative pressure within the cell capture system. Each lane of the capture chamber comprises a removable alignment plate, comprising a polycarbonate filter and first and second o-rings, the o-rings sandwiching and creating a substantially watertight seal around the polycarbonate filter; an input head, comprising a substantially cylindrical staining reservoir; and an output head, comprising a threaded connector and disposed below and in fluid communication with the polycarbonate filter. The staining reservoir of each lane is disposed above and in fluid communication with the polycarbonate filter and has a diameter no greater than inner diameters of the first and second o-rings, which are preselected to define a desired cell capture area on a surface of the polycarbonate filter. The staining reservoir may have a height of between about 25.4 mm and about 28.4 mm, and may have a volume of at least about 50 µL. Each polycarbonate filter may have a pore size of between about 200 nm and about 5 µm, or of about 800 nm. Each first and second o-ring may conform to the AS568 or ISO 3601 standard.

This disclosure further provides a method for labeling and mounting cells in a suspension, comprising loading, under water, a removable alignment plate, comprising a polycarbonate filter and first and second o-rings, into each lane of a capture chamber of a cell capture system, wherein the first and second o-rings sandwich and create a substantially watertight seal around the polycarbonate filter; flushing each lane with water; loading and pulling 70% ethanol through each lane; loading and pulling 1:4000 True Black in 70% ethanol through each lane; loading a volume of 1:4000 True Black in 70% ethanol in each lane, pulling about half of the volume, allowing a remaining portion of the volume to incubate for about 10 minutes at room temperature, and pulling the remaining portion of the volume; loading and pulling water through each lane; loading a volume of 0.01% poly-d-lysine in each lane, pulling about half of the volume, allowing a remaining portion of the volume to incubate for about 10 minutes at room temperature, and pulling the remaining portion of the volume; loading and pulling a portion of the suspension through each lane; flushing each lane with phosphate-buffered saline; loading a volume of 4% formaldehyde in water in each lane, pulling about half of the volume, allowing a remaining portion of the volume to incubate for about 10 minutes on ice, and pulling the remaining portion of the volume; flushing each lane with permeabilization/wash buffer; loading a volume of permeabilization/wash buffer in each lane, pulling about half of the volume, allowing a remaining portion of the volume to incubate for about 10 minutes on ice, and pulling the remaining portion of the volume; loading a volume of 6 µL/mL immunoglobulin G in each lane, pulling about half of the volume, allowing a remaining portion of the volume to incubate for about 15 minutes on ice, and pulling the remaining portion of the volume; flushing each lane with permeabilization/wash buffer; loading a volume of a suspension of antibodies in each lane, pulling about half of the volume, allowing a remaining portion of the volume to incubate for about 30 minutes on ice, and pulling the remaining portion of the volume; flushing each lane with permeabilization/wash buffer; loading a volume of a suspension or solution of at least one labeling agent in each lane, pulling about half of the volume, allowing a remaining portion of the volume to incubate for about 15 minutes at room temperature, and pulling the remaining portion of the volume; flushing each lane with nanopure water; and mounting the cells. Each lane of the capture chamber comprises an input head, comprising a substantially cylindrical staining reservoir, and an output head, disposed below and in fluid communication with the polycarbonate filter and comprising a well adapted to receive the alignment plate. The staining reservoir is disposed above and in fluid communication with the polycarbonate filter and has a diameter no greater than inner diameters of the first and second o-rings. The inner diameters of the first and second o-rings are preselected to define a desired cell capture area on a surface of the polycarbonate filter. The suspension of antibodies may comprise equal parts by volume anti-pan-cytokeratin and anti-CD45, suspended in permeabilization/wash buffer. The suspension or solution of the at least one labeling agent may comprise DAPI and Bodipy, suspended or dissolved in permeabilization/wash buffer. The mounting step may comprise the substeps of depositing water on a slide and an anti-fade reagent on a coverslip; placing one of the polycarbonate filters in the deposited water on the slide; applying the coverslip atop the polycarbonate filter; and sealing the coverslip to the slide with nail polish. The cells may comprise one or more of white blood cells and cancer cells.

The embodiments and configurations described herein are neither complete nor exhaustive. As will be appreciated, other embodiments of the invention are possible utilizing, alone or in combination, one or more of the features set forth above or described in detail below.

DETAILED DESCRIPTION

As used herein, "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

It is to be noted that the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

Unless defined otherwise, all technical and scientific terms used herein have the same meaning as is commonly understood by one of ordinary skill in the art. All patents, applications, published applications, and other publications to which reference is made herein are incorporated by reference in their entirety. In the event that there is a plurality of definitions for a term herein, the definition provided in the Summary prevails unless otherwise stated.

As used herein, the term "cell" is used to refer to any biological cell or chemical or physical particle. Examples of "cells" as that term is used herein include, but are not limited to, white blood cells, red blood cells, platelets, epithelial cells, bacterial cells, viruses, protein molecules, nucleic acid molecules, and inorganic nanoparticles.

As used herein, the terms "load and pull" or "loading and pulling" are used to refer to the process of placing a quantity of a liquid solution or suspension into an inlet end of a vessel ("loading"), and then forcing the quantity of liquid solution or suspension out of an outlet end of the vessel by vacuum or other negative pressure means ("pulling").

Figure 1A:
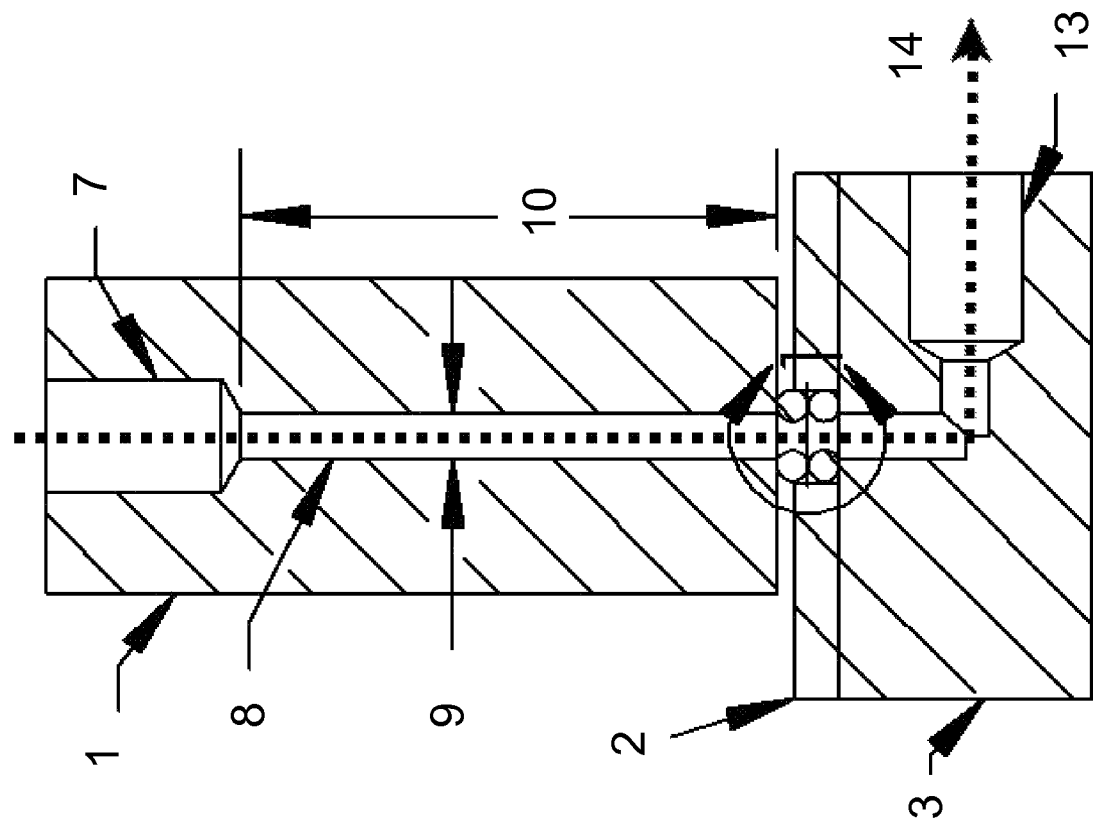
FIG. 1A is a side cross-sectional view of a cell capture device, according to embodiments of this disclosure.
Figure 1B:
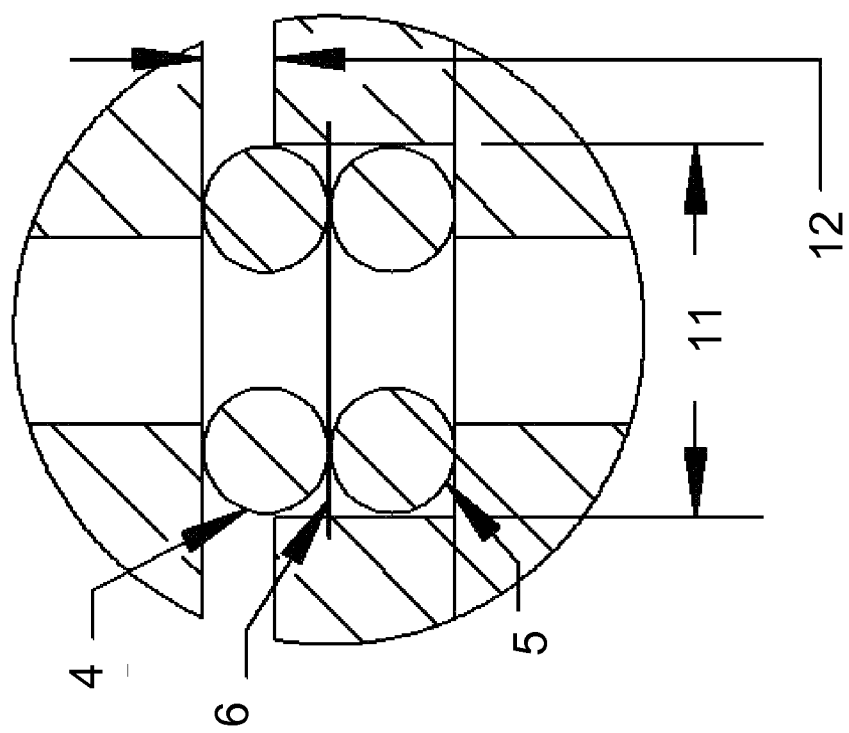
FIG. 1B is a detail view of the circled portion of FIG. 1A.

Referring now to FIGS. 1A and 1B, a cell capture device comprises an input head 1, an alignment plate 2, and an output head 3. The alignment plate 2 is removable and comprises o-rings 4, 5 and a polycarbonate filter 6. The o-rings 4, 5 are sandwiched by the input head 1 and output head 3 and create a substantially watertight seal around the polycarbonate filter 6. In the illustrated embodiment, input head 1 comprises a threaded connector 7 adapted to be interconnected to a pump or other positive pressure source. Input head 1 also comprises a substantially cylindrical staining reservoir 8, which has a diameter 9 and a height 10. The diameter 9 of the staining reservoir 8 is smaller than an inner diameter of the o-rings 4, 5, and the height 10 of the staining reservoir 8 is selected to be long enough that a standard gel loading pipet tip cannot poke the polycarbonate filter 6, thereby damaging or destroying it, but short enough that a standard gel loading pipet tip can reach to within about 3 mm of the polycarbonate filter, to allow processing fluids to be loaded onto the polycarbonate filter 6 without introducing air bubbles. The alignment plate 2 has a diameter 11 and a height that is small enough for a compression gap 12 to enable sealing of the device. In the illustrated embodiment, output head 3 comprises a threaded connector 13 adapted to be interconnected to a vacuum or other negative pressure source. Fluids loaded into the input head 1 flow past the polycarbonate filter 6 of the alignment plate 2, then into and out of the output head 3, following flow direction 14.

The cell capture device illustrated in FIGS. 1A and 1B can be fabricated by a combination of machining, 3D printing, and purchase of off-the-shelf parts. The cell laydown area of the cell capture device is configurable by choosing o-rings of appropriate size and modification of the alignment plate or fabrication of a new alignment plate, which can be 3D printed.

Figure 2:
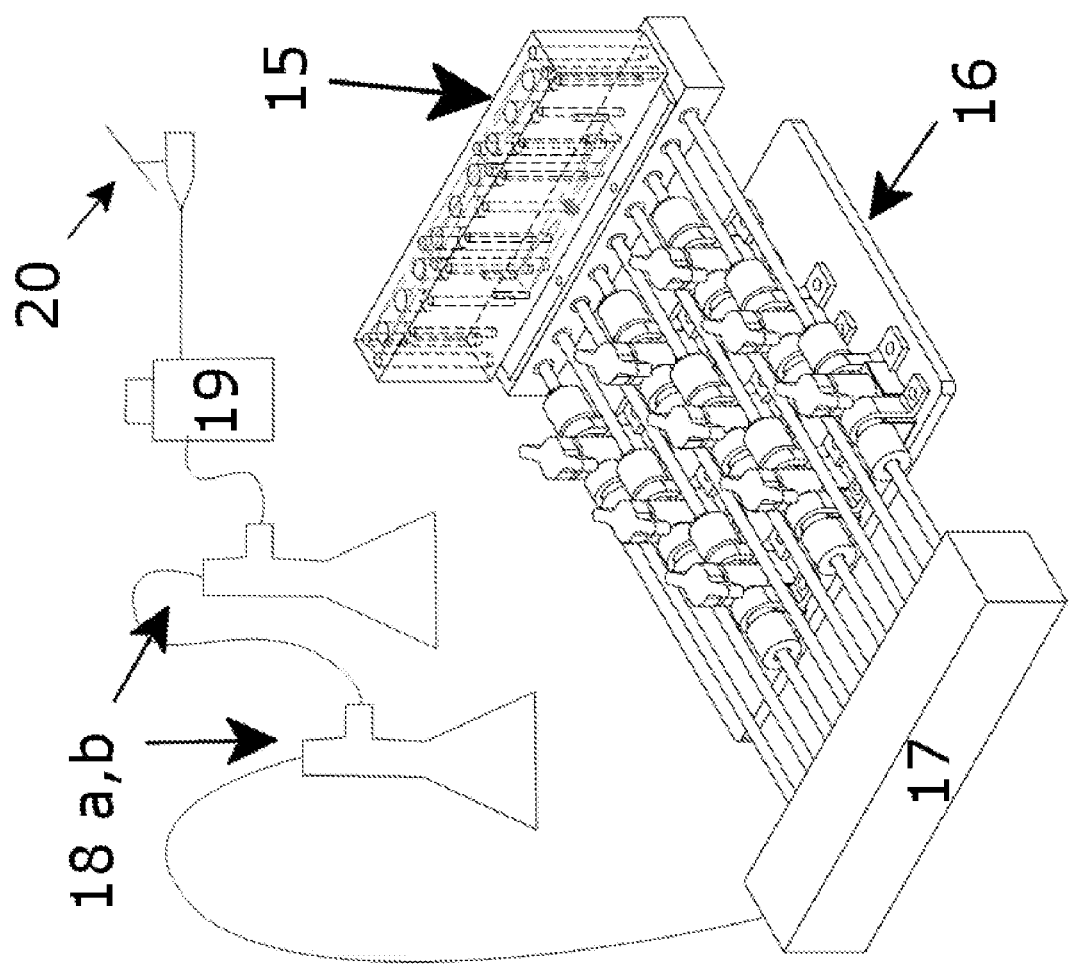
FIG. 2 is a perspective view of a cell capture system, according to embodiments of this disclosure.

Referring now to FIG. 2, a cell capture system comprises a cell capture chamber 15, which in turn comprises a plurality of lanes. In a preferred embodiment, each lane of the cell capture chamber 15 comprises a cell capture device as illustrated in FIGS. 1A and 1B. Fluids may be pulled through the lanes of the cell capture chamber 15 by vacuum or other negative pressure means, which may be controlled by a stop cock panel 16 interconnected to the lanes of the cell capture chamber 15. The cell capture system further comprises a manifold 17 interconnected to the stop cock panel 16. In the illustrated embodiment, aspiration steps 18a,b are interconnected to the manifold 17. The cell capture system further comprises a regulator 19, interconnected to the other components of the cell capture system and to a vacuum or other negative pressure source 20. By way of non-limiting example, the negative pressure source 20 may be a lab vacuum. The regulator 19 controls negative pressure within the cell capture system.

Example 1

Figure 3:
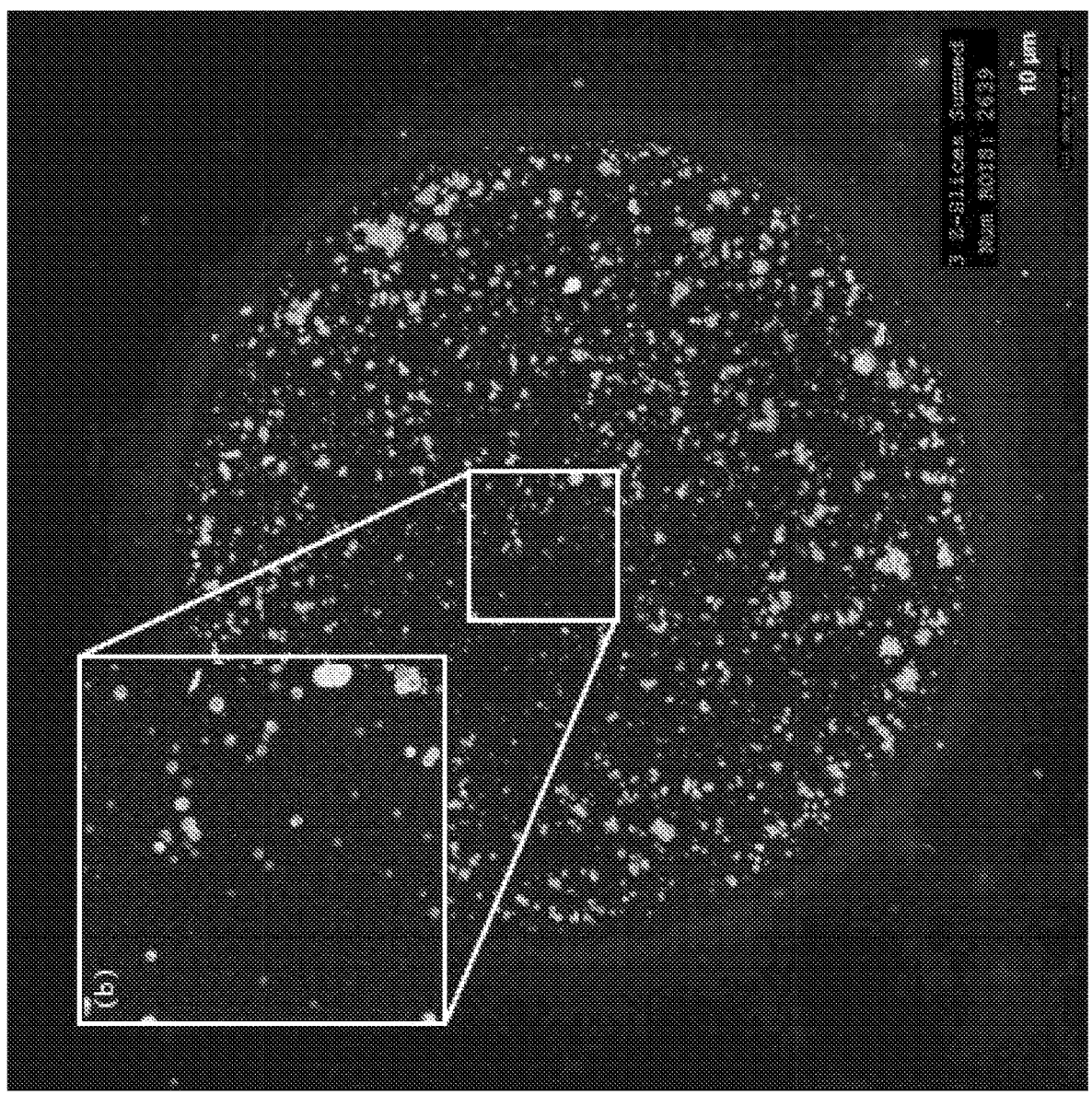
FIG. 3 is a microscopic image of cells filtered, labeled, and mounted according to embodiments of this disclosure.

Referring now to FIG. 3, white blood cells and MCF7 cancer cells are labeled for DAPI, Bodipy, pan-cytokeratin, and CD45. The pictured cells have been filtered, labeled, and mounted on a track-etched polycarbonate filter in a cell capture device and system, according to embodiments of this disclosure.

Embodiments of this disclosure encompass methods for filtering, labeling, and mounting cells. The cells pictured in FIG. 3 were filtered, labeled, and mounted according to the following exemplary embodiment of such methods:

1) The lanes of a cell capture chamber of a cell capture system, as illustrated in FIG. 2, are loaded with alignment plates/filters. The loading of alignment plates is preferably performed under water to prevent the formation of air bubbles.

2) The lanes of the cell capture chamber are flushed with water.

3) 90 µL of 70% ethanol is loaded and pulled through each lane.

4) 90 µL of 1:4000 True Black in 70% ethanol is loaded and pulled through each lane.

5) 90 µL of 1:4000 True Black in 70% ethanol is loaded in each lane. 45 µL is pulled immediately, while the remaining volume is allowed to incubate for 10 minutes at room temperature before being pulled.

6) 30 µL of water is loaded and pulled through each lane.

7) 30 µL of 0.01% poly-d-lysine is loaded in each lane. 15 µL is pulled immediately, while the remaining volume is allowed to incubate for 10 minutes at room temperature before being pulled.

8) A suspension of the cells of interest is loaded and pulled through each lane.

9) Each lane is flushed with 30 µL of phosphate-buffered saline.

10) 50 µL of 4% formaldehyde in water is loaded in each lane. 25 µL is pulled immediately, while the remaining volume is allowed to incubate for 10 minutes on ice before being pulled.

11) Each lane is flushed with 30 µL of permeabilization/wash buffer.

12) 30 µL of permeabilization/wash buffer is loaded in each lane. 15 µL is pulled immediately, while the remaining volume is allowed to incubate for 10 minutes on ice before being pulled.

13) 20 µL of 6 µL/mL immunoglobulin G is loaded in each lane. 10 µL is pulled immediately, while the remaining volume is allowed to incubate for 15 minutes on ice before being pulled.

14) Each lane is flushed with 20 µL of permeabilization/wash buffer.

15) 3 parts by volume of anti-pan-cytokeratin and 3 parts by volume of anti-CD45 are mixed into 100 parts by volume of permeabilization/wash buffer. 10 µL of the resulting mixture is loaded in each lane. 5 µL is pulled immediately, while the remaining volume is allowed to incubate for 30 minutes on ice before being pulled.

16) Each lane is flushed with 30 µL of permeabilization/wash buffer.

17) Equal parts by mass DAPI and Bodipy are mixed in permeabilization/wash buffer such that each labeling agent is present at a concentration of 1 µg/mL. 30 µL of this mixture is loaded in each lane. 15 µL is pulled immediately, while the remaining volume is allowed to incubate for 15 minutes at room temperature before being pulled.

18) Each lane is flushed with 30 µL of nanopure water.

19) The cells are mounted. For each lane, 2 µL of water is deposited on a slide, and 8 µL of an anti-fade mounting reagent is deposited on a coverslip. Each lane is pulled dry, and each filter is placed into the water on a slide. The coverslips are applied atop the polycarbonate filters with a coverslip mounter. The coverslips are sealed with nail polish.

The foregoing description has been presented for purposes of illustration and description. The foregoing is not intended to limit the invention to the form or forms disclosed herein. In the foregoing Detailed Description, for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment.

Moreover, though the description of the invention has included description of one or more embodiments and certain variations and modifications, other variations, combinations, and modifications are within the scope of the invention, e.g. as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, whether or not such alternate, interchangeable, and/or equivalent structures, functions, ranges, or steps are disclosed herein, and without intending to publicly dedicate any patentable subject matter.

What is claimed is:

1. A cell capture device comprising
   an input head, comprising a substantially cylindrical staining reservoir;
   an output head, disposed below the input head and defining an output port;
   a removable alignment plate defining a through hole and positioned between the input head and the output head;
   a polycarbonate filter positioned within the through hole; and
   first and second o-rings positioned within the through hole sandwiching the polycarbonate filter and creating a substantially watertight seal around the polycarbonate filter;
   wherein the staining reservoir is disposed above and in fluid communication with the polycarbonate filter and has a diameter no greater than inner diameters of the first and second o-rings,
   wherein the output port in the output head is in fluid communication with the polycarbonate filter; and
   wherein the inner diameters of the first and second o-rings define a cell capture area on a surface of the polycarbonate filter.

2. The cell capture device of claim 1, wherein the input head comprises a threaded connector, the threaded connector adapted to be interconnected to a pump or other positive pressure source.

3. The cell capture device of claim 1, wherein the output head comprises a threaded connector, the threaded connector adapted to be interconnected to a vacuum or other negative pressure source.

4. The cell capture device of claim 1, further comprising a well between the alignment plate and one of the input head and the output head, the alignment plate being positioned at least partially within the well.

5. The cell capture device of claim 1, wherein the staining reservoir has a height of between about 25.4 mm and about 28.4 mm.

6. The cell capture device of claim 1, wherein the staining reservoir has a volume of at least about 50 µL.

7. The cell capture device of claim 1, wherein the polycarbonate filter is track-etched.

8. The cell capture device of claim 1, wherein the polycarbonate filter has a pore size of between about 200 nm and about 5 µm.

9. The cell capture device of claim 8, wherein the polycarbonate filter has a pore size of about 800 nm.

10. The cell capture device of claim 1, wherein the first and second o-rings conform to the AS568 or ISO 3601 standard.

11. The cell capture device of claim 1, wherein the cell capture area on the surface of the polycarbonate filter defined by the inner diameters of the o-rings is between 2-3 mm².

12. The cell capture device of claim 1, wherein the alignment plate with the through hole and the output head together define a well in which the first o-ring, the polycarbonate filter, and at least part of the second o-ring fit inside.

13. A cell capture system comprising
    a capture chamber comprising a plurality of lanes, each lane comprising
       a removable alignment plate defining a through hole;
       a polycarbonate filter positioned within the through hole; and
       first and second o-rings positioned with in the through hole, sandwiching the polycarbonate filter, and creating a substantially watertight seal around the polycarbonate filter;
    an input head comprising a substantially cylindrical staining reservoir; and
    an output head comprising a threaded connector and disposed below and in fluid communication with the polycarbonate filter,
       wherein the staining reservoir is disposed above and in fluid communication with the polycarbonate filter and has a diameter no greater than inner diameters of the first and second o-rings, and
       wherein the inner diameters of the first and second o-rings define a cell capture area on a surface of the polycarbonate filter;
    a stop cock panel, interconnected to the threaded connector of the output head of at least one lane of the capture chamber;
    a manifold, interconnected to the stop cock panel; and
    a regulator, interconnected to the manifold and to a vacuum source and controlling negative pressure within the cell capture system.

14. The cell capture system of claim 13, wherein each staining reservoir has a height of between about 25.4 mm and about 28.4 mm.

15. The cell capture system of claim 13, wherein each staining reservoir has a volume of at least about 50 µL.

16. The cell capture system of claim 13, wherein each polycarbonate filter has a pore size of between about 200 nm and about 5 µm.

17. The cell capture system of claim 13, wherein each first and second o-ring conforms to the AS568 or ISO 3601 standard.

18. The cell capture system of claim 13, wherein the cell capture area on the surface of each of the polycarbonate filters defined by the inner diameters of the o-rings is between 2-3 mm$^2$.

\* \* \* \* \*